Dec. 25, 1928.  1,696,861
B. A. PLIMPTON
INSULATOR SUPPORTING PIN
Filed March 21, 1927
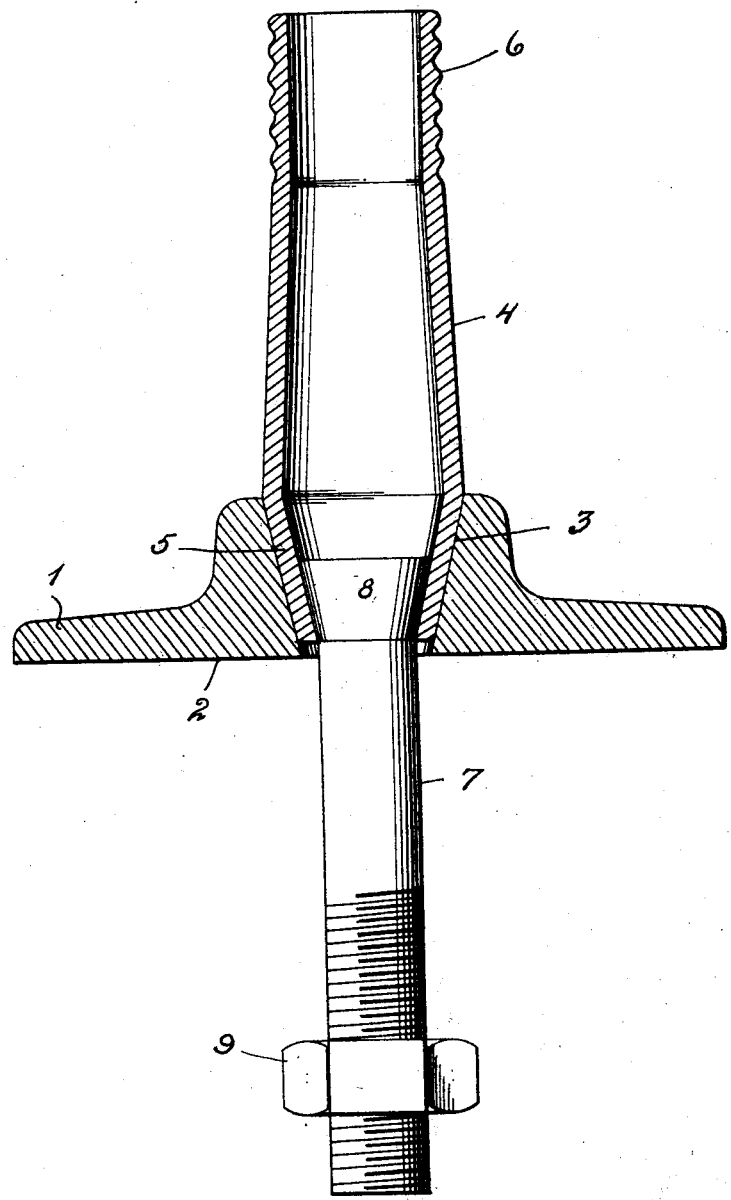
Witness
John Milton Juster
Inventor
Bentley A. Plimpton
By Ernest P. Mechlin
Attorney Patented Dec. 25, 1928.

1,696,861

UNITED STATES PATENT OFFICE.

BENTLEY A. PLIMPTON, OF BALTIMORE, MARYLAND, ASSIGNOR TO LOCKE INSULATOR CORPORATION, OF BALTIMORE, MARYLAND, A CORPORATION OF MARYLAND.

INSULATOR-SUPPORTING PIN.

Application filed March 21, 1927. Serial No. 176,978.

The invention relates broadly to insulator supports and has particular reference to an improved or novel pin adapted to be used in connection with a cross arm for the purpose of supporting an insulator.

The principal object of the invention, generally stated, is to provide a supporting pin embodying a plurality of parts and provided with novel means for effecting securing of the parts together and mounting of the assembly upon a cross arm.

An important object of the invention is to provide a multiple part pin of such construction that a single securing element will act to hold the parts assembled in rigid relation and to mount the entire device in its operative position.

Another object of the invention is to provide a supporting pin so constructed that a part thereof may be readily rotated, even after mounting, to bring the usual slot or groove in the insulator in alinement with the conductor to be supported thereon, the work of installation being consequently greatly facilitated.

Yet another object of the invention is the provision of a supporting device of this character so constructed that the parts may be drawn closely and tightly together to effect securing regardless of whatever manufacturing variations there may be in the component parts or elements.

An additional object is to provide a supporting pin of this character which will be simple and inexpensive to manufacture, easy to apply or use, positive in action, efficient and durable in service, and a general improvement in the art.

With the above and other objects and advantages in view, the invention preferably consists in the arrangement and combination of parts and detailed structural features to be hereinafter more fully described and claimed, and illustrated in the accompanying drawing in which:

The figure is a vertical longitudinal section through the device.

Referring more particularly to the drawing I have shown the support as comprising a base 1 which may have its undersurface 2 plane or curved, as the case may be, depending upon the shape of the cross arm, not shown, that is to say, depending upon whether the cross arm be of the flat or roofed type. It is preferable that this base be constructed of forged steel, though it is conceivable that some other material might be used, and it is formed with a central tapered or inverted frusto-conical opening or seat 3. This base constitutes a support for a hollow post member 4 which is preferably of malleable iron and which is tapered in both directions from an intermediate point to define an inverted frusto-conical end portion 5 adapted to seat conformingly within the opening or seat 3. The upper or other end of this post is preferably formed with a standard thread 6 and is of standard diameter so as to be capable of screwing engagement within the usual thimble now provided in most cases in insulators of the type to be used in conjunction with a pin and cross arm mounting. The thimble and insulator are not shown as they are not essential to a proper understanding of the present invention which has to do only with the pin.

The device further includes a bolt 7 adapted to pass through a suitable hole in a cross arm, this bolt having one end expanded, upset or otherwise formed to define a tapered or inverted frusto-conical head 8 adapted to fit closely and conformingly within the tapered lower end portion 5 of the post. The diameter of the opening in the upper end of the post is at least slightly greater than the maximum diameter of the head 8 so that the bolt may be inserted or slipped through the post so as to occupy the position illustrated.

To effect assembling, the bolt is first inserted through the post and the post then engaged within the opening or seat 3 in the base 1, or the post engaged with the base and the bolt then inserted, the sequence of the steps being immaterial. The insulator may be applied to the post either before or after the post is mounted on the cross arm, this sequence being likewise of no conesquence. The bolt is of course passed through the hole in the cross arm and tightening effected by means of a nut 9 which is adapted to engage against the underside of the cross arm. Prior to final tightening of the bolt, the post carrying the insulator may be turned, if necessary, to bring the groove with which such insulators are usually formed into alinement with the conductor to be supported. Of course, after the nut is screwed down firmly any turning movement would be prevented owing to the jamming engagement of the bolt head with the inner wall of the tapered portion 5 of the post and the jamming of the tapered portion into or onto the seat or wall of the opening 3. There is clearly a wedging action which will act not only to hold all the parts assembled in rigid relation but to maintain them in true axial position, any tilting or lateral displacement being avoided. Attention is directed to the fact that the tapered end portion 5 of the post is of less length than the height of the opening 3 so that when the parts are in final assembled position the end of this tapered portion 5 will be spaced above the plane of the bottom of the base so as not to contact with the cross arm. This is an important feature for the reason that it takes care of the minor variations which are found to occur in the manufacture of the component parts of the device. When, for any reason, it is necessary to remove the pin, the reverse operation may be followed in an obvious manner.

From the foregoing description and a study of the drawing it will be apparent that I have thus provided a simply constructed, inexpensive and easily assembled pin which will possess great strength and durability in addition to the advantages above enumerated.

While I have shown and described the preferred embodiment of the invention it should be understood that this is merely an exemplification of the principles involved as the right is reserved to make all such changes in the matter of materials, size and shape of parts and other details as will not depart from the spirit of the invention or the scope of the claims hereunto appended.

Having thus described the invention, I claim:

1. An insulator supporting pin of the character described comprising a base, a hollow post extending partly through the base and having a seat therein, and a bolt insertable through the post and cooperating therewith for securing the same with respect to the base, the bolt being adapted for passage through a cross arm to effect mounting, the base, adjacent portion of the post and bolt having a wedging interrelation.

2. An insulator supporting pin of the character described comprising a base, a hollow post adapted to be secured within an insulator, and a bolt insertable through the post and cooperating therewith for securing the same with respect to the base, the bolt being adapted for passage through a cross arm to effect mounting, the base having a tapered opening therein, the post having a tapered portion conformingly engaging within said opening, and the bolt having a correspondingly tapered head.

3. In a device of the character described, the combination of a base having an opening therein, a hollow post having a tapered fit within the opening, and a bolt insertable through the post and having a tapered fit therewith, said bolt being adapted for passage through a cross arm and acting to maintain the parts in assembled relation and to mount the assembly.

4. An insulator supporting pin structure comprising a base having a tapered seat therein, a hollow post having a portion conformingly engaging said seat, and a bolt insertable through the post from the top thereof and adapted to pass through a cross arm, said bolt having a tapered head conformingly engaging within the post for forcing the same into tight engagement with the seat.

5. An insulator supporting pin structure comprising a base having a tapered seat therein, a hollow post having a portion conformingly engaging said seat, and a bolt insertable through the post from the top thereof and adapted to pass through a cross arm, said bolt having a tapered head conformingly engaging within the post for forcing the same into tight engagement with the seat, said portion of the post being of less length than the height of the seat to avoid contact of its end with the cross arm and to take care of manufacturing variations.

In testimony whereof I affix my signature.

BENTLEY A. PLIMPTON.